(12) United States Patent
Hatsugai et al.

(10) Patent No.: US 7,314,679 B2
(45) Date of Patent: Jan. 1, 2008

(54) AIR SUPPLY APPARATUS FOR A FUEL CELL

(75) Inventors: Tsutomu Hatsugai, Wako (JP); Toshirou Kiura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 463 days.

(21) Appl. No.: 10/888,990

(22) Filed: Jul. 13, 2004

(65) Prior Publication Data

US 2005/0014047 A1  Jan. 20, 2005

(30) Foreign Application Priority Data

Jul. 15, 2003  (JP)  .............................. 2003-274909
Jul. 23, 2003  (JP)  .............................. 2003-278504

(51) Int. Cl.
*H01M 2/00*  (2006.01)

(52) U.S. Cl. ........................................................ 429/34

(58) Field of Classification Search .................. 429/34, 429/26
See application file for complete search history.

(56) References Cited

U.S. PATENT DOCUMENTS 4,490,442 A  *  12/1984  Maru et al. .................... 429/13

FOREIGN PATENT DOCUMENTS

| JP | 58-201266 | * | 11/1983 |
| JP | 63-276878 | | 11/1988 |
| JP | 63-294670 | * | 12/1988 |
| JP | 07-006777 | | 1/1995 |
| JP | 10-247505 | | 9/1998 |

OTHER PUBLICATIONS

Office Action from the Japanese Patent Office dated May 15, 2007 in the corresponding Japanese Patent Application No. 2003-274909.

* cited by examiner

*Primary Examiner*—Patrick Joseph Ryan
*Assistant Examiner*—Thomas H. Parsons
(74) *Attorney, Agent, or Firm*—Westerman, Hattori, Daniels & Adrian, LLP.

(57) ABSTRACT

In an air supply apparatus of a fuel cell having a fuel electrode and an air electrode, the air sucked in by an air blower is fed as cooling air to the cooling are passage groove, and a manifold is provided as a communicating member to communicate the exhaust side of a cooling air passage groove with the suction side of a reaction air passage groove (air electrode) such that both cooling air and reaction air are fed to the fuel cell by driving a single air blower. With this, the consumed electricity needed to drive the air supply fan can be reduced, and an increase in the size and weight can be suppressed. In addition, a flow-uniforming device such as current plates, a punching plate or a sponge plate are provided in the manifold.

6 Claims, 11 Drawing Sheets

FIG. 11

| 1 | 2 | 3 | 4 |
|---|---|---|---|
| //// | //// | //// | //// |
| //// | //// | //// | //// |
| 8 | 7 | 6 | 5 |

| 1 | 2 | 3 | 4 |
|---|---|---|---|
| 1 | 1 | 1.8 | 1 |
| 1 | 1 | 1.3 | 1 |
| 8 | 7 | 6 | 5 |

322h2

AIR SUPPLY APPARATUS FOR A FUEL CELL

BACKGROUND OF THE INVENTION

1. Field of the Invention

The present invention relates to an air supply apparatus for a fuel cell.

2. Description of the Related Art

Fuel cells generate power by an electrochemical reaction caused by hydrogen supplied to a fuel electrode and reaction air (oxygen) supplied to an air electrode, and the reaction air is normally supplied to the air electrode by means of a fan (air blower). Also, fuel cells are supplied with cooling air for suppressing temperature increases due to power generation, and in conventional practice the cooling air is supplied by a fan provided separately from the fan for supplying the reaction air (as taught, for example, in FIG. 1, etc., in Japanese Laid-Open Patent Application No. Hei 7(1995)-6777.

SUMMARY OF THE INVENTION

As described above, the prior art has had drawbacks in that since two fans are used, one for supplying reaction air and one for supplying cooling air, electricity consumption increases and the fuel cell unit on which the fans are mounted increases in both size and weight.

Aside from the above, in order to stably and efficiently operate a fuel cell, cooling air and reaction air must be uniformly fed to each unit cell constituting the fuel cell. However, using a centrifugal fan or other device that does not compress sucked or aspirated air at high pressure as the air supply apparatus has drawbacks in that the pressure (flow rate) of the sucked air is not uniform and the cooling air and reaction air cannot be supplied uniformly to each unit cell because the back pressure of the sucked air does not reach a high pressure.

In view of this, it is common in conventional practice to uniformly supply cooling air and reaction air to each unit cell by using a pump or the like to compress the sucked air to a high pressure of 1 kPa or more, for example, and to increase the back pressure of the sucked air. However, this approach has had drawbacks in that a large amount of electricity must be consumed to drive the pump or other device capable of compressing cooling air or reaction air to a high pressure.

Therefore, an object of this invention is to solve the problems described above and to provide an air supply apparatus for a fuel cell that reduces the consumed electricity necessary to drive a fan for supplying cooling air or reaction air to the fuel cell, and that suppresses an increase in size and weight of the fuel cell unit.

A second object of this invention is to solve the problems described above and to provide an air supply apparatus for a fuel cell in which air is uniformly fed to each unit cell constituting the fuel cell while a centrifugal fan is used that does not compress sucked air to a high pressure, thereby allowing the fuel cell to be operated stably and efficiently, and the consumed electricity necessary to drive the air supply apparatus to be reduced.

According to a first aspect of this invention, there is provided an air supply apparatus of a fuel cell that changes chemical energy of a fuel supplied through a fuel electrode and oxidant supplied through an air electrode to electric energy, comprising: an air blower sucking in air to supply to a cooling air passage of the fuel cell as cooling air and to the air electrode of the fuel cell as reaction air; and a communicating member communicating an exhaust side of the cooling air passage and a suction side of the air electrode such that cooled exhaust expelled from the cooling air passage is fed as the reaction air to the air electrodes via the communicating member.

According to a second aspect of this invention, there is provided an air supply apparatus of a fuel cell that changes chemical energy of a fuel supplied through a fuel electrode and oxidant supplied through an air electrode to electric energy, comprising: an air blower sucking in air to supply to the air electrode of the fuel cell; a manifold disposed between the air blower and the fuel cell and having a passage through which the sucked air is supplied to the air electrode of the fuel cell; and a flow-uniforming device disposed in the passage of the manifold such that flow rate of the sucked air to be supplied to the air electrode of the fuel cell is made uniform.

BRIEF DESCRIPTION OF THE DRAWINGS

The above and other objects and advantages of the invention will be more apparent from the following description and drawings, in which:

FIG. 11 is an explanatory diagram showing the pressure exerted on the surface of a sponge plate shown in FIG. 10 by sucked air; and FIG. 12 is an explanatory diagram showing the thicknesses of area 3 and area 6 as a ratio, assuming the thickness of areas 1, 2, 4, 5, 7, and 8 of the sponge plate shown in FIG. 11 is 1.

DESCRIPTION OF THE PREFERRED EMBODIMENTS

An air supply apparatus for a fuel cell according to embodiments of the invention will now be explained with reference to the attached drawings.

Preferred embodiments of the air supply apparatus for a fuel cell according to this invention will now be described with reference to the accompanying diagrams.

Figure 1:
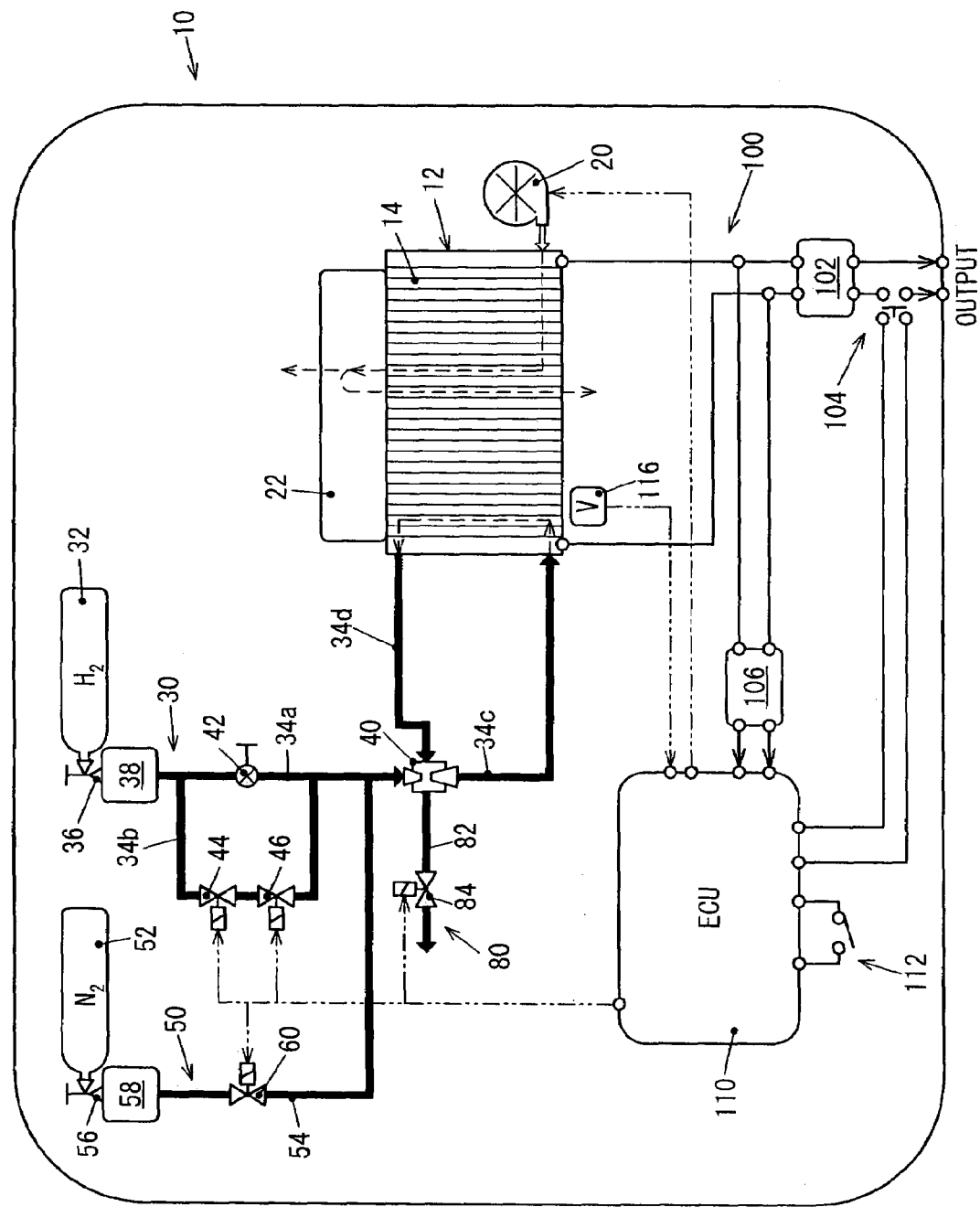
FIG. 1 is a schematic view showing an air supply apparatus for a fuel cell according to the first embodiment of this invention as part of a fuel cell unit.

FIG. 1 is a schematic view showing an air supply apparatus for a fuel cell according to the first embodiment of this invention as part of a fuel cell unit.

In FIG. 1, the symbol 10 indicates a power generating unit including the air supply apparatus for a fuel cell according to the first embodiment. The power generating unit 10 is packaged into a portable size with a fuel cell 12, pipes, and other such elements necessary for power generation.

The fuel cell (specifically, a stacked member, or cell stack) 12 is formed by stacking a plurality of unit cells (cells) 14. Specifically, 70 cells can be stacked in this manner. The fuel cell generates a rated output of 1.05 kW. The unit cells 14 are conventionally known solid polymer fuel cells including an electrolyte membrane (solid polymer membrane), an air electrode (cathode electrode) and fuel electrode (anode electrode) on both sides of the membrane, and a separator disposed on the outer sides of both electrodes. A detailed description thereof is omitted.

The fuel cell 12 is connected with an air blower 20 that supplies cooling air to the fuel cell 12, and is also provided with a manifold (communicating member) 22 for communicating the exhaust side of the cooling air passage grooves with the suction side of the reaction air passage grooves (neither are shown in FIG. 1) formed in the unit cells 14.

Also, a hydrogen gas supply system 30 for supplying hydrogen gas to the fuel cell 12 is connected to the fuel cell 12. The hydrogen gas supply system 30 includes a hydrogen gas cylinder 32 with hydrogen sealed at a high pressure, channels (fluid supply channels) 34a to 34d for connecting the hydrogen gas cylinder 32 to the fuel cell 12, and other elements disposed between the two, to be hereinafter described.

The hydrogen gas cylinder 32 is connected to a regulator 38 via a manual cylinder valve 36, and the regulator 38 is connected to an ejector 40 via a first channel 34a. A main valve (manual valve) 42 is disposed in the middle of the first channel 34a, and a second channel 34b that bypasses the main valve 42 is connected thereto. A first magnetic (electromagnetic) valve 44 and a second magnetic (electromagnetic) valve 46 are disposed in the middle of the second channel 34b.

The ejector 40 is connected to the fuel electrodes of the fuel cell 12 via a third channel 34c and a fourth channel 34d. The third channel 34c is a supply-side channel and the fourth channel 34d is an exhaust-side channel.

Also, a nitrogen gas supply system 50 for supplying purge gas (inert gas; for example, nitrogen gas) to the fuel cell 12 is connected downstream of the main valve 42 in the first channel 34a. The nitrogen gas supply system 50 includes a nitrogen gas cylinder 52 with nitrogen sealed at a high pressure, a fifth channel 54 for connecting the nitrogen gas cylinder 52 to the first channel 34a, and elements disposed in the middle thereof, to be hereinafter described.

The nitrogen gas cylinder 52 is connected to a regulator 58 via a manual cylinder valve 56, and the regulator 58 is connected to the first channel 34a via the fifth channel 54. Also, a third magnetic (electromagnetic) valve 60 is disposed in the middle of the fifth channel 54.

A purge gas exhaust system 80 is connected to the ejector 40. The purge gas exhaust system 80 includes a purge gas exhaust channel 82 connected to the ejector 40, and a fourth magnetic (electromagnetic) valve 84 disposed in the middle of the purge gas exhaust channel 82.

An output circuit 100 is connected to the output terminal of the fuel cell 12. The output circuit 100 is connected to an external device (not shown) via a first DC-DC converter 102 and a relay 104, and is also connected to an ECU (Electronic Control Unit) 110 via a second DC-DC converter 106. An operating switch 112 that can be turned on and off from the exterior and the relay 104 are both connected to the ECU 110. The ECU 110 comprises a microcomputer.

Also, a voltage sensor 116 is provided to the unit cells 14 of the fuel cell 12. The voltage sensor 116 outputs a signal according to the magnitude of the output voltage V of the fuel cell 12, and this output is transmitted to the ECU 110.

The power generating operation of the fuel cell 12 will now be described based on the configuration described above.

The high-pressure hydrogen sealed in the hydrogen gas cylinder 32 is fed to the regulator 38 by manually opening the cylinder valve 36. The hydrogen gas reduced and adjusted in pressure by the regulator 38 is fed to the ejector 40 via the first channel 34a by manually operating (opening) the main valve 42, and is further fed to the fuel electrodes of the fuel cell 12 via the third channel 34c. The first through fourth magnetic valves 44, 46, 60, and 84 shown in FIG. 1 should all be closed when the operation of the fuel cell 12 is complete, so as to prevent hydrogen gas and nitrogen gas from leaking to the exterior when the fuel cell 12 is not operating. In other words, the first through fourth magnetic valves 44, 46, 60, and 84 are all normally closed magnetic valves (magnetic valves that close in a de-energized state and open in an energized state).

Power generation is initiated in the unit cells 14 of the fuel cell 12 as a result of the hydrogen gas fed to the fuel electrodes causing an electrochemical reaction with the reaction air (oxygen) present in the air electrodes. The unreacted gas that has not participated in the electrochemical reaction with the air from the hydrogen gas fed to the fuel electrodes is circulated back to the ejector 40 via the fourth channel 34d, and is again fed to the fuel electrode via the third channel 34c.

When the fuel cell 12 starts to generate power, the electrical power is converted to a DC voltage of appropriate magnitude by the second DC-DC converter 106 provided to the output circuit 100, and is then fed to the ECU 110 as an operating power source.

Having been started up after being supplied with electricity, the ECU 110 opens the first magnetic valve 44 and the second magnetic valve 46, feeds hydrogen gas to the fuel electrodes via the second channel 34b, and actuates the air blower 20.

The air sucked in or aspirated by the air blower 20 is fed to the cooling air passage grooves of the unit cells 14 as cooling air. Some of the cooled exhaust that passes through the cooling air passage grooves is expelled to the exterior, while the rest is turned back to the interior of the manifold 22 and fed as reaction air to the reaction air passage grooves. The reaction air that passes through the reaction air passage grooves is expelled or exhausted to the exterior as exhaust.

When the ECU 110 starts up and the first magnetic valve 44 and second magnetic valve 46 are opened, there is no longer a need to manually operate the main valve 42. Therefore, the ECU 110 informs the operator via an audio or visual or other such suitable information device (not shown) that the fuel cell 12 has started generating power and that the ECU 110 has started up; in other words, that preparations are in order for supplying electricity to the external device.

When the operating switch 112 is manually operated (switched on) by an operator who has been informed that the preparations are in order for supplying electricity to the external device, the ECU 110 actuates the relay 104 provided to the output circuit 100, and establishes electric conduction between the first DC-DC converter 102 and the external device. Thus, the electricity generated by the fuel cell 12 is fed to the external device via the relay 104 after being converted to a DC voltage of appropriate magnitude by the first DC-DC converter 102.

Also, the ECU 110 operates the magnetic valves and purges the fuel cell 12 on the basis of the output of the voltage sensor 116 and the like. Specifically, when the detected value of the voltage sensor 116 decreases to a specific value or less, the first magnetic valve 44 and second magnetic valve 46 mounted on the second channel 34b are closed, and the third magnetic valve 60 mounted on the fifth channel 54 and the fourth magnetic valve 84 mounted in the purge gas exhaust channel 82 are opened.

The supply of nitrogen gas is thereby blocked off and the high pressure nitrogen gas sealed in the nitrogen gas cylinder 52 is fed to the regulator 58 via the cylinder valve 56, where it is reduced and adjusted in pressure and is then fed to the fuel electrodes of the fuel cell 12 via the fifth channel 54, ejector 40, and third channel 34c. The cylinder valve 56 should be opened by the operator in advance when the fuel cell 12 begins operating.

The nitrogen gas fed to the fuel electrodes is expelled outside from the fuel cell 12 via the fourth channel 34d, ejector 40, and purge gas exhaust channel 82 while the unreacted gas and the resulting water accumulated in the fuel electrodes are forced out of the fuel cell 12.

Figure 2:
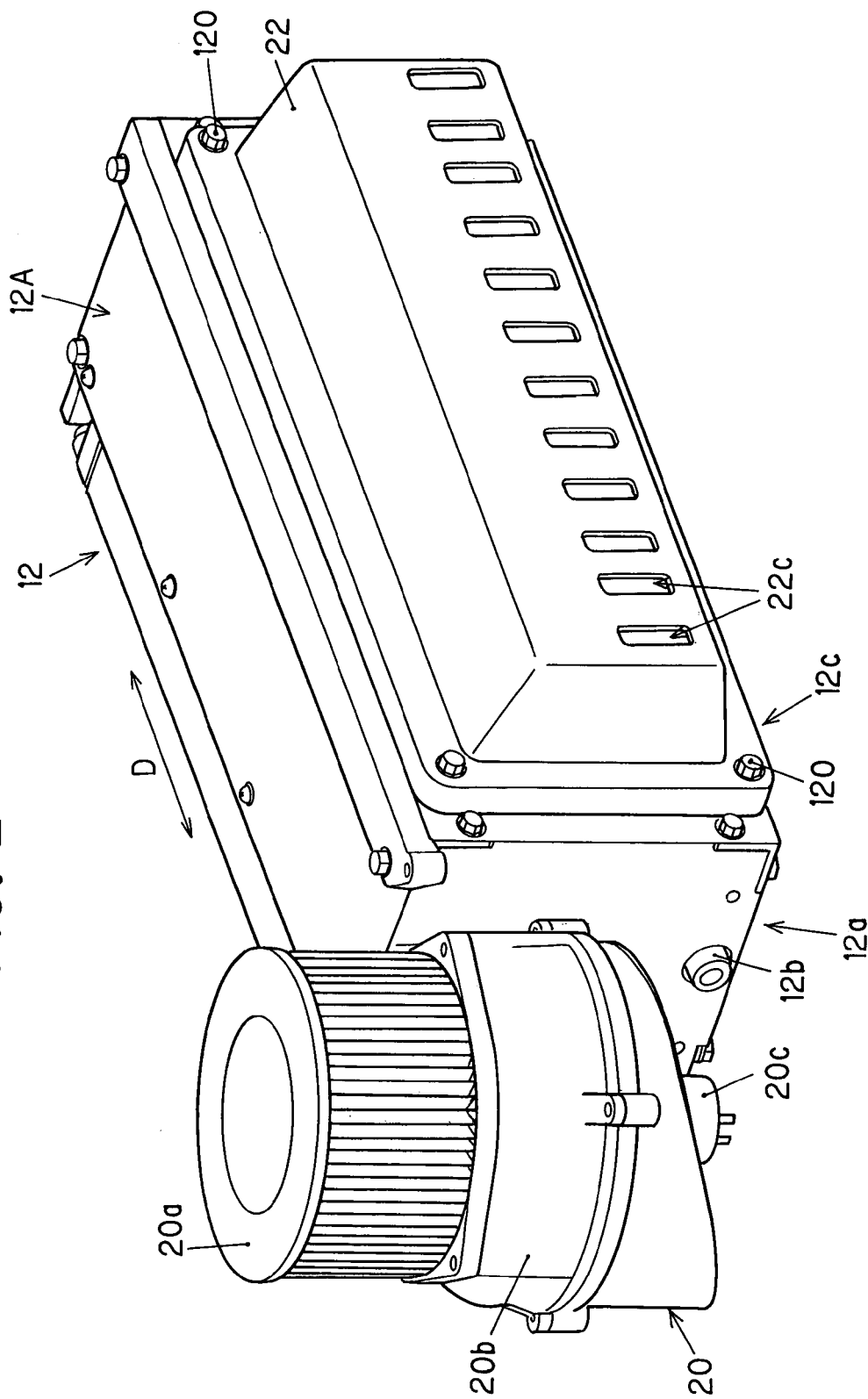
FIG. 2 is a perspective view of the fuel cell shown in FIG. 1.

FIG. 2 is a perspective view of the fuel cell 12.

The fuel cell 12 includes a case 12A, and the unit cells 14 are disposed in a stacked arrangement inside the case 12A, as shown in FIG. 2. The side surface 12a of the case 12A, more specifically, the side surface located along the extension of the stacking direction D of the unit cells 14, is provided with a cooling air supply port (not shown) whereby the air blower 20 is connected. An air, filter 20a is mounted in the suction vent of the air blower 20. Also, the air blower 20 includes a scroll cover 20b, and a fan (not shown) fixed to the output axle of an electric motor 20c is mounted in the interior thereof. The side surface 12a of the fuel cell is also provided with a hydrogen gas supply port 12b connected with the hydrogen gas supply system 30, or, more specifically, the third channel 34c on the supply side. Also, the manifold 22 is mounted on the side surface 12c of the case 12A (the side surface orthogonal to the side surface 12a) via four bolts 120.

Figure 3:
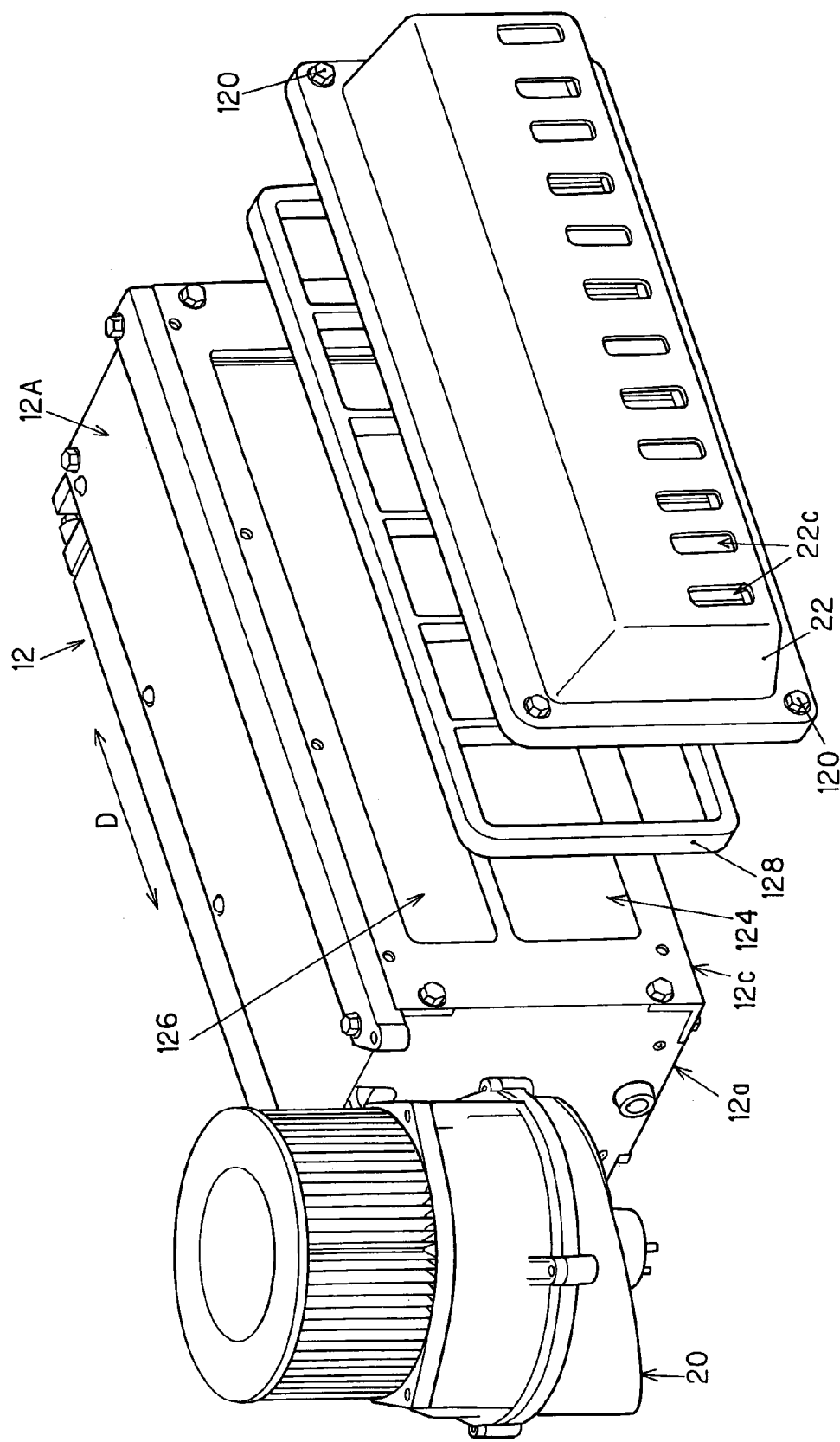
FIG. 3 is a perspective view showing the fuel cell in FIG. 1 with the manifold removed.

FIG. 3 is a perspective view showing the fuel cell 12 with the manifold 22 removed.

Two rectangular openings (indicated by the symbols 124 and 126) are provided to the side surface 12c such that their long sides are parallel to the stacking direction D, as shown in FIG. 3. The opening indicated by the symbol 124 is a discharge vent whereby cooled exhaust is discharged (hereinafter referred to as "cooled exhaust discharge vent"), and is communicated with the exhaust side of a cooling air passage groove, to be hereinafter described. The opening indicated by the symbol 126 is a suction vent for reaction air (hereinafter referred to as "reaction air suction vent"), and is communicated with the suction side of an air electrode, to be hereinafter described. The cooled exhaust discharge vent 124 is formed larger than the reaction air suction vent 126, as shown in the diagram.

Figure 4:
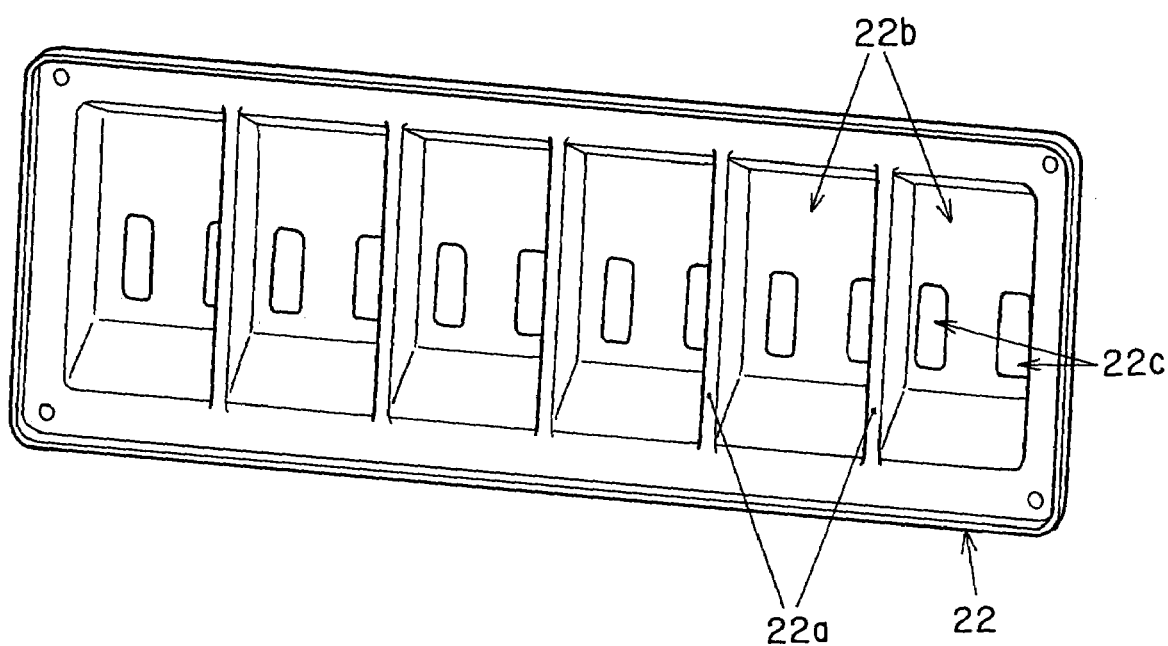
FIG. 4 is a perspective view of the manifold in FIG. 3 as seen from the side in contact with the side surface of the fuel cell case.

FIG. 4 is a perspective view of the manifold 22 as seen from the side in contact with the side surface 12c of the case 12A. The manifold 22 is formed into convexities in the direction away from the side surface 12c, as shown in FIGS. 3 and 4. A plurality (specifically, five) of barrier walls 22a (shown in FIG. 4) orthogonal to the stacking direction D is provided inside the convexities, whereby a plurality (specifically, six) of communication channels 22b is formed.

The manifold 22 is mounted on the side surface 12c so as to cover the cooled exhaust discharge vent 124 and the reaction air suction vent 126. The cooled exhaust discharge vent 124 and reaction air suction vent 126 are thereby communicated via the communication channels 22b. A seal member 128 (made of polyethylene) is held between the manifold 22 and the side surface 12c, whereby the manifold 22 is mounted on the side surface 12c in an airtight manner.

In the manifold 22, a plurality of exhaust ports 22c; specifically, two per communication channel 22b for a total of twelve, is provided to the section located along the extension of the cooled exhaust discharge vent 124.

Figure 5:
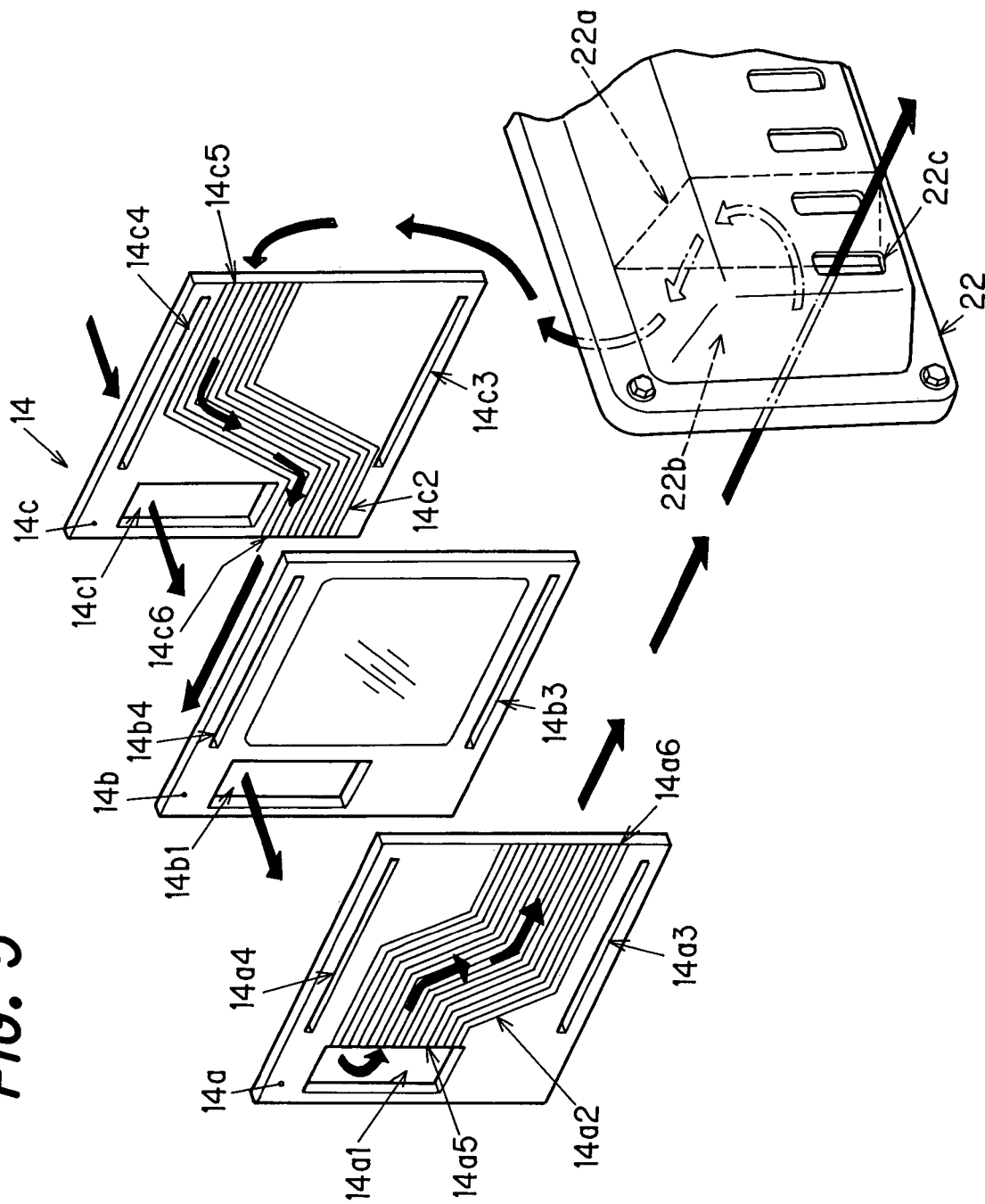
FIG. 5 is an explanatory diagram showing the flow of cooling air and reaction air in the fuel cell shown in FIG. 2.

FIG. 5 is an explanatory diagram showing the flow of cooling air and reaction air in the fuel cell 12.

The unit cells 14 include an anode separator 14a, an electrolyte membrane 14b, and a cathode separator 14c, as shown in FIG. 5. The anode separator 14a, electrolyte membrane 14b, and cathode separator 14c are provided with respective cooling air supply communication holes $14a1$, $14b1$, and $14c1$ that serve as channels for cooling air, and the cooling air supply communication holes $14a1$, $14b1$, and $14c1$ are connected to the air blower 20.

A cooling air passage groove $14a2$ that serves as a channel for cooling air is formed in the anode separator 14a, and the cooling air passage groove $14a2$ is connected to (communicated with) the cooling air supply communication hole $14a1$. Also, a reaction air passage groove $14c2$ that functions as a channel for reaction air is formed in the cathode separator 14c.

The anode separator 14a, electrolyte membrane 14b, and cathode separator 14c are also provided with respective hydrogen gas supply communication holes $14a3$, $14b3$, and $14c3$ that serve as channels for hydrogen gas on the supply side and are connected to the third channel 34c. Furthermore, the anode separator 14a, electrolyte membrane 14b, and cathode separator 14c are provided with respective hydrogen gas exhaust communication holes $14a4$, $14b4$, and $14c4$ that serve as channels for hydrogen gas on the exhaust side and are connected to the fourth channel 34d. The hydrogen gas supply communication hole $14a3$ and hydrogen gas exhaust communication hole $14a4$ formed in the anode separator 14a are connected (communicated) via a hydrogen gas passage groove (not shown) formed in the back of the surface on which the cooling air passage groove $14a2$ is formed in the anode separator 14a.

The air sucked in or aspirated by the air blower 20 is passed through the cooling air supply communication holes $14a1$, $14b1$, and $14c1$, and is fed as cooling air to the cooling air passage groove $14a2$ formed in one surface of the anode separator 14a from the suction side $14a5$ thereof. The cooling air fed to the cooling air passage groove $14a2$ absorbs the heat produced by power generation, increases in temperature, leaves as cooled exhaust from the exhaust side $14a6$ of the cooling air passage groove $14a2$, and enters the communication channels 22b of the manifold 22 via the cooled exhaust discharge vent 124 (not shown in FIG. 5).

The cooled exhaust flowing into the communication channels 22b is turned back inside the communication channels 22b, and is fed as reaction air to the reaction air passage groove (air electrode) $14c2$ formed in the cathode separator 14c from the suction side $14c5$ thereof. The reaction air fed to the reaction air passage groove $14c2$ is expelled as off-gas to the outside of the fuel cell 12 from the exhaust side $14c6$.

Also, part of the cooled exhaust flowing into the communication channels 22b is expelled to the outside of the fuel cell 12 via the exhaust ports 22c provided to the manifold 22. Specifically, the flow rate of cooled exhaust fed to the air electrodes as reaction air is adjusted by the partial removal of the cooled exhaust to the exterior via the exhaust ports 22c. This is because the necessary flow rate of reaction air is small in comparison to the flow rate of cooling air. Therefore, the total surface area of the exhaust ports 22c is appropriately set such that the optimal amount of reaction air is fed to the air electrodes, or, more specifically, about one tenth the flow rate of the cooled exhaust is fed to the air electrodes as reaction air.

Thus, the first embodiment is configured to have an air supply apparatus of a fuel cell 12 (made of stacked unit cells 14) that changes chemical energy of a fuel supplied through a fuel electrode and oxidant supplied through an air electrode to electric energy, comprising: an air blower 20 sucking in air to supply to a cooling air passage (groove) 14a2 of the fuel cell as cooling air and to the air electrode of the fuel cell as reaction air; and a communicating member (e.g., manifold 22) communicating an exhaust side 14a6 of the cooling air passage and a suction side 14a5 of the air electrode such that cooled exhaust expelled from the cooling air passage is fed as the reaction air to the air electrodes via the communicating member, and the communicating member (manifold 22) has an exhaust port 22c that expels part of the cooled exhaust to exterior such that flow rate of the cooled exhaust to be fed to the air electrodes is adjusted.

More specifically, the first embodiment is configured such that the air sucked in by the air blower 20 is fed as cooling air to the cooling air passage groove 14a2 formed in the anode separator 14a, and the manifold 22 is provided to communicate the exhaust side 14a6 of the cooling air passage groove 14a2 with the suction side 14c5 of the reaction air passage groove (air electrode) 14c2 formed in the cathode separator 14c, whereby the cooled exhaust expelled from the cooling air passage groove 14a2 is fed as reaction air to the air electrodes via the manifold 22. Specifically, since the configuration is such that both cooling air and reaction air are fed to the fuel cell 12 by driving a single air blower 20, the consumed electricity needed to drive the air supply fan (air blower) can be reduced, and an increase in the size and weight of the power generating unit 10 can be suppressed.

Also, cooling air that has absorbed the heat produced by power generation and that has a higher temperature than the external air is used as the reaction air, so the amount of saturated steam is greater than when the external air is used as is as the reaction air, and therefore more of the produced water (steam) accumulated in the air electrodes can be expelled (removed).

Furthermore, the manifold 22 is provided with exhaust ports 22c for expelling part of the cooled exhaust to the exterior and is configured so as to adjust the flow rate of cooled exhaust fed to the air electrodes, so the optimal amount of reaction air can be fed to the air electrodes even when a large amount of cooled exhaust is used as the reaction air.

Next, the air supply apparatus for a fuel cell according to the second embodiment of this invention will be described.

Figure 6:
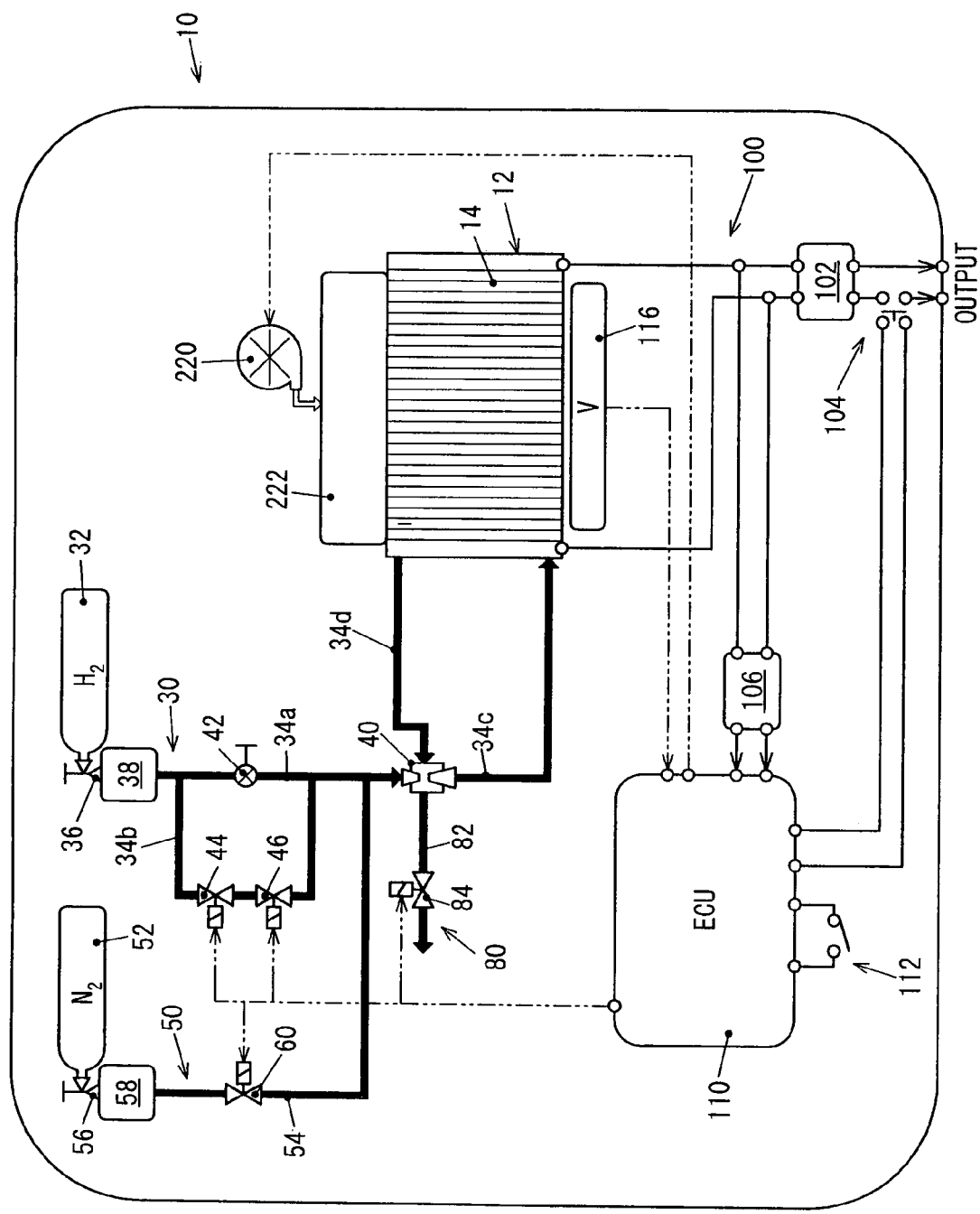
FIG. 6 is a schematic view showing the air supply apparatus for a fuel cell according to the second embodiment of this invention as part of a fuel cell unit.

FIG. 6 is a schematic view showing the air supply apparatus for a fuel cell according to the second embodiment of this invention as part of a fuel cell unit. The difference between this embodiment and the first embodiment is that an air blower 220 for feeding cooling air and reaction air to the fuel cell 12 is connected to the fuel cell 12 via a manifold 222, and the air sucked in by the air blower 220 is fed to the unit cells 14 as cooling air or reaction air via the manifold 222. Also, the cooling air and reaction air passing through the unit cells 14 is expelled out of the fuel cell 12.

Figure 7:
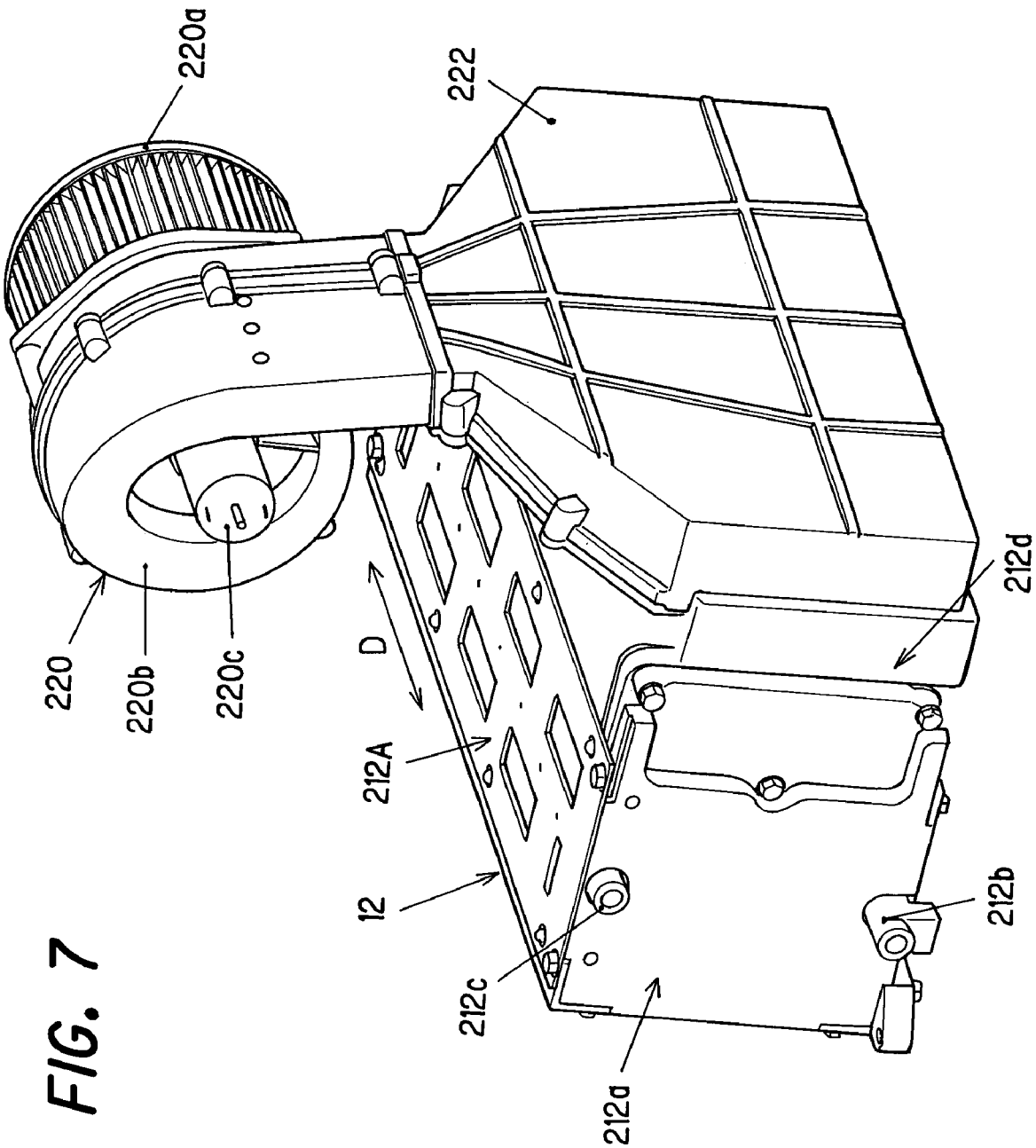
FIG. 7 is a perspective view of the fuel cell shown in FIG. 6, and of the air blower and manifold connected thereto.

FIG. 7 is a perspective view of the fuel cell 12, and of the air blower 220 and manifold 222 connected thereto.

The fuel cell 12 is provided with a case 212A, and the unit cells 14 are disposed in a stacked arrangement inside the case 212A, as shown in FIG. 7. The side surface 212a of the case 212A, more specifically, the side surface located along the extension of the stacking direction D of the unit cells 14, is provided with a hydrogen gas supply port 212b and a hydrogen gas exhaust port 212c. The third channel 34c (not shown in FIG. 7) as part of the hydrogen gas supply system is connected to the hydrogen gas supply port 212b, and the fourth channel 34d (not shown in FIG. 7) is connected to the hydrogen gas exhaust port 212c.

Also, the manifold 222 is mounted on the side surface 212d of the case 212A (the side surface orthogonal to the side surface 212a), and the air blower 220 is connected to the manifold 222. An air filter 220a is mounted in the intake port of the air blower 220. The air blower 220 also includes a scroll cover 220b, and a fan (not shown) fixed to the output axle of an electric motor 220c is mounted in the interior thereof. The air blower 220 is specifically a centrifugal fan, and the sucked air is compressed to a low pressure of several hundred Pa.

Figure 8:
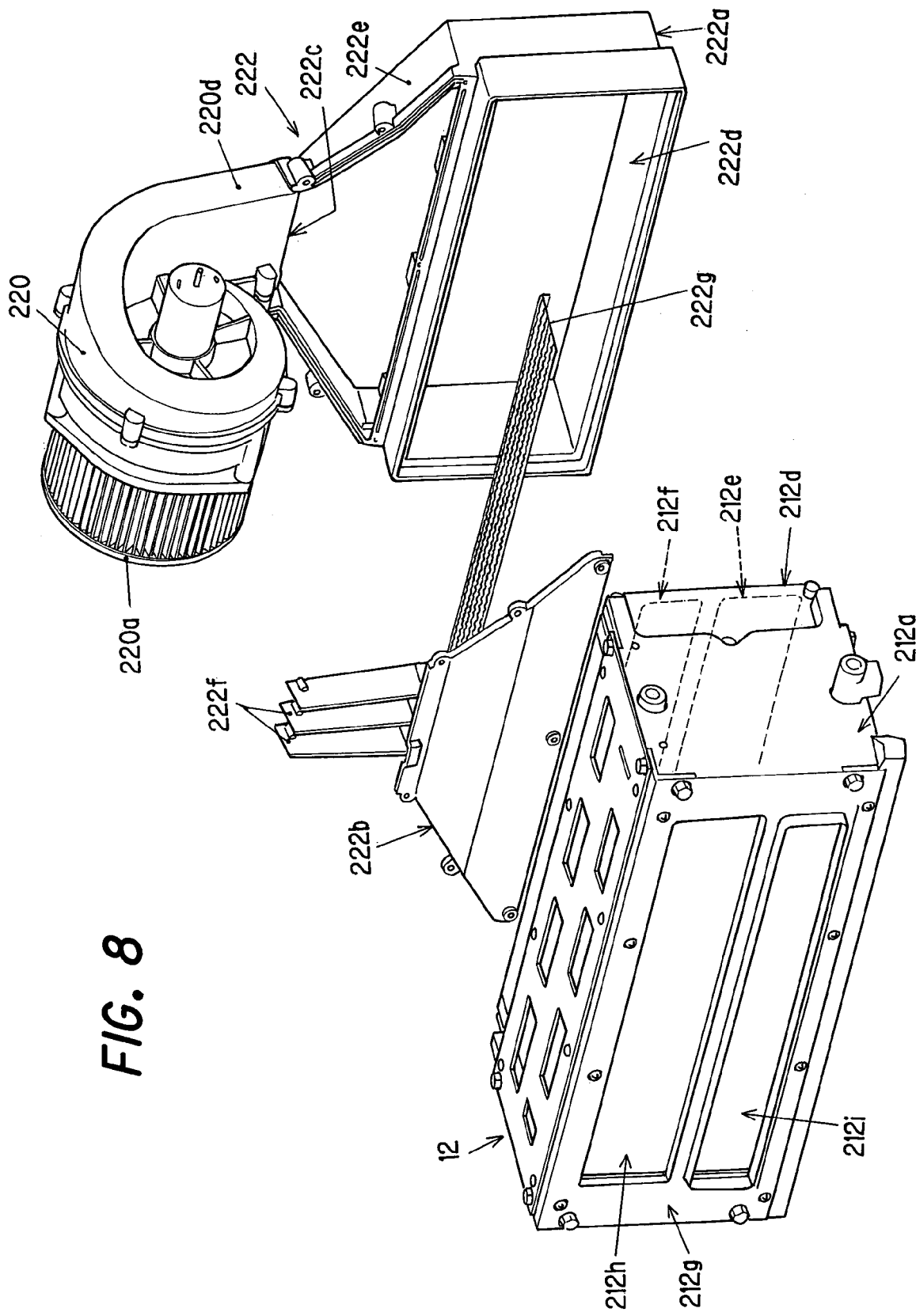
FIG. 8 is a perspective view showing the manifold removed from the fuel cell shown in FIG. 7 and disassembled.

FIG. 8 is a perspective view showing the manifold 222 removed from the fuel cell 12 and disassembled.

As shown in FIG. 8, two rectangular openings (indicated by the symbols 212e and 212f) are provided to the side surface 212d of the fuel cell 12 such that the long sides thereof are parallel to the stacking direction D shown in FIG. 7. The opening shown by the symbol 212e is a supply port for cooling air (hereinafter referred to as "cooling air supply port"), and is communicated with the supply side of a cooling air passage groove formed in an anode separator (not shown). Also, the opening shown by the symbol 212f is a supply port for reaction air (hereinafter referred to as "reaction air supply port"), and is communicated with the supply side of a reaction air passage groove formed in a cathode separator (not shown). The cooling air supply port 212e is formed larger than the reaction air supply port 212f, as shown in the diagram.

Also, two rectangular openings (indicated by the symbols 212h and 212i) are provided to the side surface 212g of the fuel cell 12 (the side surface facing the side surface 212d) such that the long sides thereof are parallel to the stacking direction D. Among these, the opening indicated by the symbol 212h is a discharge vent for cooling air (hereinafter referred to as "cooling air exhaust port"), and is communicated with the exhaust side of the cooling air passage groove. The opening indicated by the symbol 212i is an exhaust port for reaction air (hereinafter referred to as "reaction air exhaust port"), and is communicated with the exhaust side of the reaction air passage groove. The cooling air exhaust port 212h is formed larger than the reaction air exhaust port 212i, as shown in the diagram.

The manifold 222 comprises a main body 222a and a cover 222b. The main body 222a includes an air suction vent 222c and an air discharge vent 222d, and also includes an expanding section 222e that expands progressively from the air suction vent 222c side (upstream) towards the air discharge vent 222d side (downstream). Also, in the main body 222a, one side of the expanding section 222e is open and the cover 222b is mounted therein.

The air blower 220 is connected to the air suction vent 222c of the main body 222a. The air discharge vent 222d is formed to be substantially the same size as the side surface 212d of the fuel cell 12, and the cooling air supply port 212e and reaction air supply port 212f provided to the side surface 212d are adapted to be covered by the air discharge vent 222d when the main body 222a is mounted in the fuel cell 12.

The cover 222b includes a plurality of current plates (flow-uniforming device) 222f. Specifically, three plates may be provided. Some of the current plates 222f are inserted into the discharge channel 220d of the air blower 220, and the remainder is mounted on the expanding section 222e of the main body 222a, when the cover 222b is mounted on the main body 222a. The three current plates 222f are arranged such that the distances therebetween become progressively larger towards the downstream of the manifold 222 (towards the air discharge vent 222d).

In addition, in the main body 222a, a punching plate (also acting as a flow-uniforming device) 222g is mounted downstream of the current plates 222f (specifically, between the expanding section 222e and the air discharge vent 222d). A plurality (multiple number) of small holes is provided at equal intervals to the punching plate 222g.

Next, referring to FIG. 8 to describe the flow of cooling air and reaction air, the air sucked in by the air blower 220 flows to the discharge channel 220d and the expanding section 222e after dust is removed by the air filter 220a, and the flow is made more uniform by the current plates 222f mounted therein and is made substantially uniform. The air with the substantially uniform current speed is further made more uniform and endowed with a uniform current speed by passage through the punching plate 222g. The size and interval of the small holes in the punching plate 222g are set so as to cause a specific pressure loss in the sucked air.

The air with the uniform current speed is expelled from the air discharge vent 222d and caused to flow into the cooling air supply port 212e and reaction air supply port 212f of the fuel cell 12. The air flowing into the cooling air supply port 212e is fed as cooling air in a uniform manner to a cooling air passage groove formed in the anode separator of the unit cells. The cooling air fed to the cooling air passage groove absorbs the heat produced by power generation and increases in temperature, and is then expelled from the exhaust side of the cooling air passage groove to the outside of the fuel cell 12 via the cooling air exhaust port 212h.

The air flowing into the reaction air supply port 212f is fed as reaction air in a uniform manner to a reaction air passage groove formed in the cathode separator of the unit cells. The reaction air fed to the reaction air passage groove is expelled from the exhaust side of the reaction air passage groove to the outside of the fuel cell 12 via the reaction air exhaust port 212i. The reason that the supply port 212f and exhaust port 212i for reaction air are formed smaller than the supply port 212e and exhaust port 212h for cooling air is because the necessary flow rate of reaction air is less than the flow rate of cooling air; specifically, the surface areas of these openings are appropriately set such that one tenth the flow rate of cooling air is fed as reaction air to the air electrodes.

Thus, the second embodiment is configured to have an air supply apparatus of a fuel cell 12 (cell units 14) that changes chemical energy of a fuel supplied through a fuel electrode and oxidant supplied through an air electrode to electric energy, comprising: an air blower 220 sucking in air to supply to the air electrode of the fuel cell; a manifold 222 disposed between the air blower and the fuel cell and having a passage through which the sucked air is supplied to the air electrode of the fuel cell; and a flow-uniforming device disposed in the passage of the manifold 222 such that flow rate of the sucked air to be supplied to the air electrode of the fuel cell is made uniform. In the apparatus, the flow-uniforming device comprises current plates 222f and a punching plate 222g, and the passage of the manifold 222 comprises an expanding section 222e that expands progressively towards a downstream end and an air discharge vent 222d connected to the downstream end of the expanding section, such that the current plates 222f are disposed in the expanding section and the punching plate 222g is disposed downstream of the current plate at a position between the expanding section and the air discharge vent, in which the current plates 222f are disposed in the expanding section 222e in such a manner that distances therebetween grow progressively larger towards the downstream end.

More specifically, in the second embodiment, the configuration is such that a plurality of current plates 222f is provided to the manifold 222 that expands progressively downstream, the current plates 222f are disposed so that the distances therebetween grow progressively larger towards the downstream of the manifold 222 (towards the air discharge vent 222d), and another flow-uniforming device comprising the punching plate 222g is provided further downstream than the current plates 222f. Therefore, even when the air blower (centrifugal fan) 220 that does not compress the sucked air to a high pressure is used, air (cooling air and reaction air) can still be uniformly supplied to the unit cells 14 constituting the fuel cell 12, whereby the fuel cell 12 can be operated stably and efficiently, and the amount of consumed electricity needed to drive the air blower 220, which is an air supply apparatus, can be reduced.

Next, the air supply apparatus for a fuel cell according to the third embodiment of this invention will be described.

Figure 9:
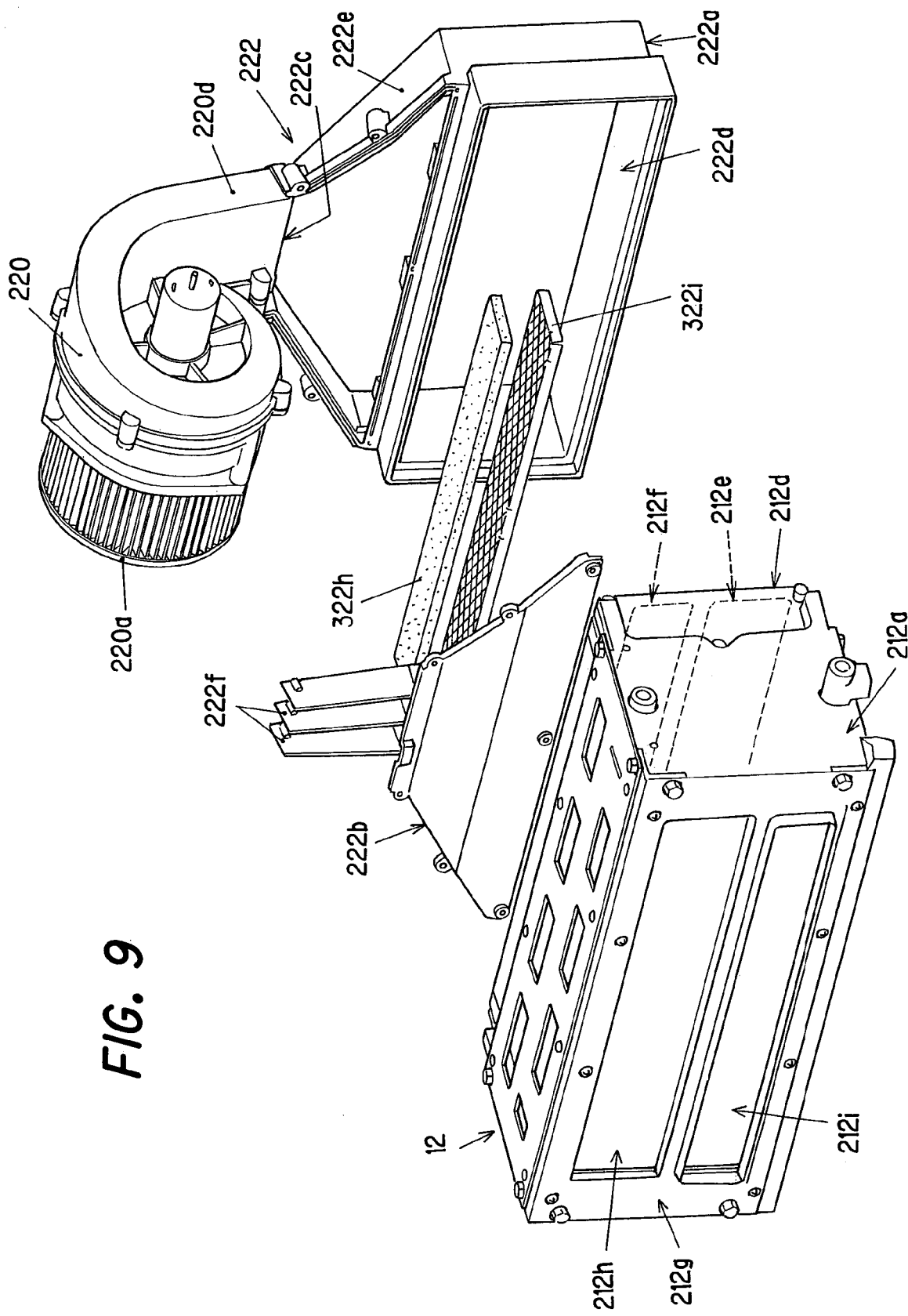
FIG. 9 is a perspective view showing the air supply apparatus for a fuel cell according to the third embodiment of this invention.

FIG. 9 is a perspective view showing the air supply apparatus for a fuel cell according to the third embodiment. The main difference with the second embodiment is that in the present embodiment, the configuration is such that a sponge plate is provided as a flow-uniforming device instead of a punching plate.

In FIG. 9, the symbol 322h indicates a plate of sponge made of urethane (i.e., a sponge configured to be a plate). The sponge plate 322h is disposed downstream of the current plates 222f (between the expanding section 222e and the air discharge vent 222d) via a metallic base plate 322i provided with a plurality of large holes.

Specifically, in the third embodiment, the air sucked in by the air blower 220 is made more uniform by the current plates 222f to have a substantially uniform current speed, and is then made more uniform and endowed with a uniform current speed by passage through the sponge plate 322h. The cell size of the sponge plate 322h is set so as to cause a specific pressure loss in the sucked air.

Thus, in the third embodiment, the configuration is such that the flow-uniforming device comprising the sponge plate 322h is provided further downstream than the current plates 222f. Therefore, even when the air blower (centrifugal fan) 220 that does not compress the sucked air to a high pressure is used, air (cooling air and reaction air) can still be uniformly supplied to the unit cells 14 constituting the fuel cell 12, whereby the fuel cell 12 can be operated stably and efficiently, and the amount of consumed electricity needed to drive the air blower 220, which is an air supply apparatus, can be reduced, similar to the second embodiment. Since the configuration and effects are otherwise the same as the second embodiment, descriptions thereof are omitted.

Next, the air supply apparatus for a fuel cell according to the fourth embodiment of this invention will be described.

Figure 10:
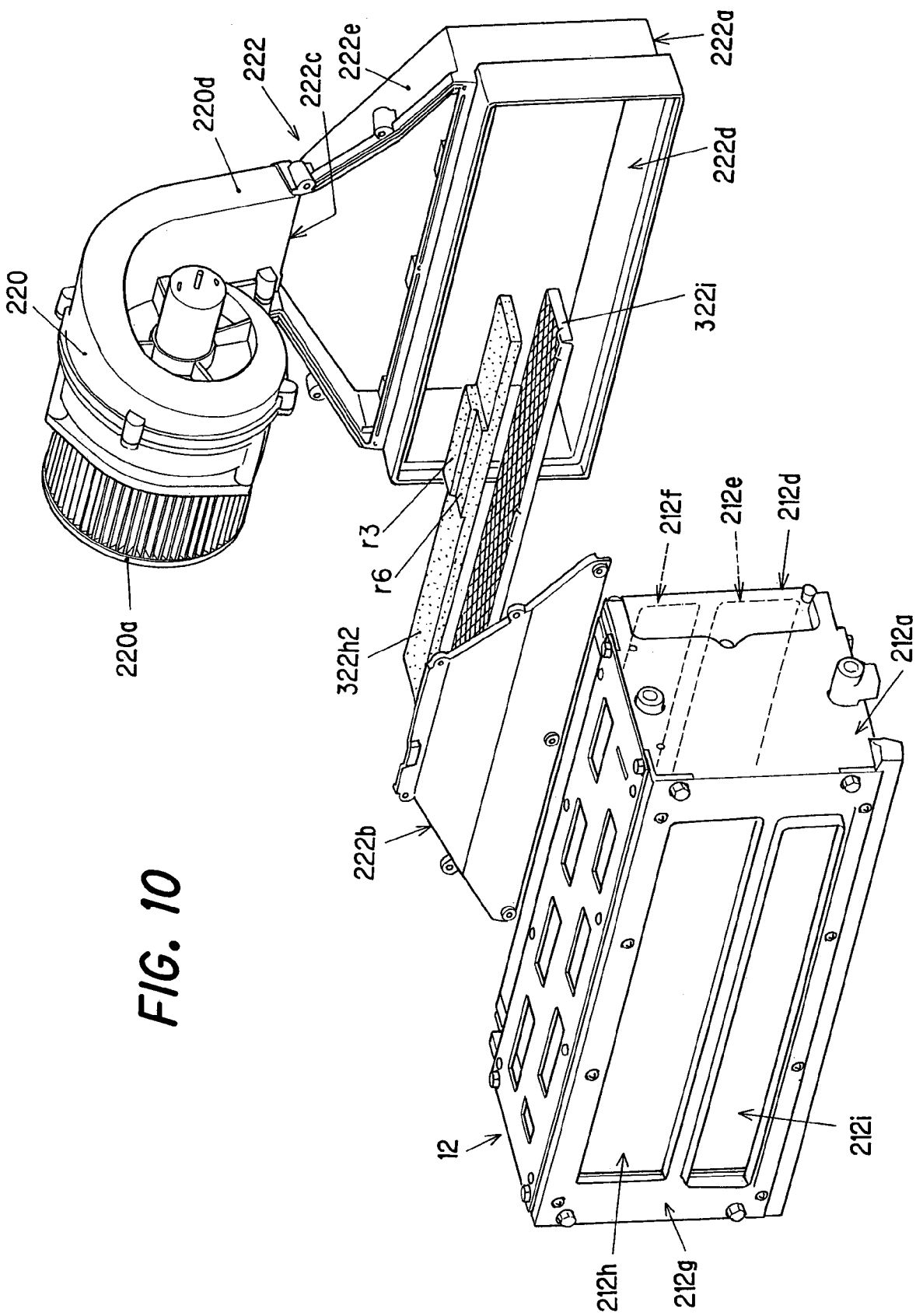
FIG. 10 is a perspective view showing the air supply apparatus for a fuel cell according to the fourth embodiment of this invention.

FIG. 10 is a perspective view showing the air supply apparatus for a fuel cell according to the fourth embodiment. The main difference with the previous embodiments is that in the present embodiment, the configuration is such that the current plates 222f formed on the cover 222b in the previous embodiments are removed, and the thickness of the sponge plate used as the flow-uniforming device is made to be partially different.

In FIG. 10, the symbol 322h2 indicates the sponge plate according to the fourth embodiment. The sponge plate 322h2 is also made of urethane as in the third embodiment.

In the present embodiment, since the current plates formed on the cover 222b are removed, the air sucked in by the air blower 220 reaches the sponge plate 322h2 via the discharge channel 220d and expanding section 222e without being made more uniform.

Figures 11, 12:
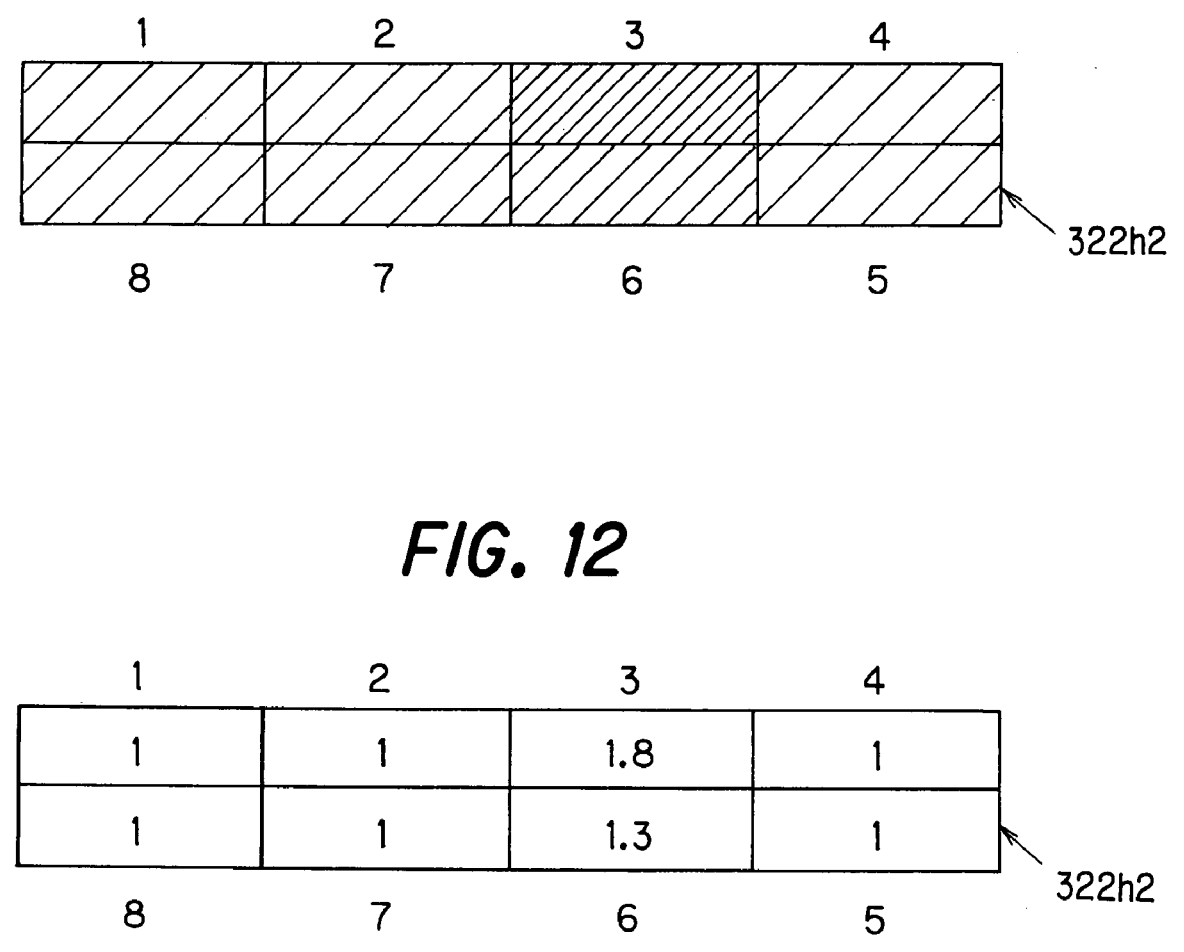

FIG. 11 is an explanatory diagram showing the pressure exerted on the surface of the sponge 322h2 by sucked air.

In FIG. 11, the areas with narrower spaces between the hatched lines are those with higher operating pressure (in other words, a higher current speed).

Specifically, FIG. 11 shows that when the sponge plate 322h2 is divided into eight areas and the pressure distribution is measured, the pressure exerted on areas 1, 2, 4, 5, 7, and 8 is substantially the same, the pressure exerted on area 6 is higher than the pressure exerted on areas 1, 2, 4, 5, 7, and 8, and the pressure exerted on area 3 is higher than the pressure exerted on area 6.

When measurement results such as those shown in FIG. 11 are obtained and it is assumed that the thickness of the sponge plate 322h2 is constant in each area, the flow rate of sucked air flowing through area 6 is greater than the flow rate flowing through areas 1, 2, 4, 5, 7, and 8, and the flow rate of air flowing through area 3 is greater than the flow rate through area 6. In view of this, in the fourth embodiment, the thickness of the sponge plate 322h2 is set to be greater in regions in which the pressure applied by the sucked air is higher; in other words, the thickness is set such that the pressure loss is greater in regions in which the pressure applied by the sucked air is higher.

FIG. 12 is an explanatory diagram showing the thicknesses of area 3 and area 6 as a ratio, assuming the thickness of areas 1, 2, 4, 5, 7, and 8 is 1.

Setting the thickness of area 6 to be, for example, 1.3 times the thickness of areas 1, 2, 4, 5, 7, and 8 (area 6 is indicated by the symbol r6 in FIG. 10), and setting the thickness of area 3 to be, for example, 1.8 times (area 3 is indicated by the symbol r3 in FIG. 10), as shown in FIG. 12, will allow the pressure loss in these areas to be increased, and therefore the pressure (current speed) of the air that has passed through the sponge plate 322h2 to be made uniform.

Thus, in the fourth embodiment, the flow-uniforming device comprises a sponge plate 322h2 and the thickness of the sponge plate is increased in regions in which pressure applied by the sucked air increases. Therefore, even when the air blower (centrifugal fan) 220 that does not compress the sucked air to a high pressure is used, air (cooling air and reaction air) can still be uniformly supplied to the unit cells 14 constituting the fuel cell 12, whereby the fuel cell 12 can be operated stably and efficiently, and the amount of consumed electricity needed to drive the air blower 220, which is an air supply apparatus, can be reduced, similar to the previous embodiments.

Since the configuration and effects are otherwise the same as the previous embodiments, descriptions thereof are omitted.

Japanese Patent Application Nos.2003-274909 filed on Jul. 15, 2003 and 2003-278504 filed on Jul. 23, 2003, are incorporated herein in its entirety.

While the invention has thus been shown and described with reference to specific embodiments, it should be noted that the invention is in no way limited to the details of the described arrangements changes and modifications may be made without departing from the scope of the appended claims.

What is claimed is:

1. An air supply apparatus for a fuel cell that changes chemical energy of a fuel supplied through a fuel electrode and oxidant supplied through an air electrode to electric energy, comprising:

an air blower sucking in air to supply to a cooling air passage of the fuel cell as cooling air and to the air electrode of the fuel cell as reaction air; and a manifold communicating an exhaust side of the cooling air passage and a suction side of the air electrode, such that at least a portion of cooled exhaust expelled from the cooling air passage is directed, as the reaction air, to the air electrodes by said manifold, wherein said manifold has at least one exhaust port open to an exterior, and wherein a surface area of said at least one exhaust port is sized such that flow rate of the cooled exhaust to be fed to the air electrodes is adjusted.

2. An air supply apparatus of a fuel cell that changes chemical energy, of a fuel supplied through a fuel electrode and oxidant supplied through an air electrode, to electric energy, comprising:

an air blower sucking in air to supply to the air electrode of the fuel cell;

a manifold disposed between the air blower and the fuel cell and having a passage through which the sucked air is supplied to the air electrode of the fuel cell; and a flow-uniforming device disposed in the passage of the manifold such that flow rate of the sucked air to be supplied to the air electrode of the fuel cell is made uniform, and wherein the flow-uniforming device comprises current plates and a punching plate.

3. The apparatus according to claim 2, wherein the passage of the manifold comprises an expanding section that expands progressively towards a downstream end and an air discharge vent connected to the downstream end of the expanding section, such that the current plates are disposed in the expanding section and the punching plate is disposed downstream of the current plate at a position between the expanding section and the air discharge vent.

4. The apparatus according to claim 3, wherein the current plates are disposed in the expanding section in such a manner that distances therebetween grow progressively larger towards the downstream end.

5. An air supply apparatus of a fuel cell that changes chemical energy, of a fuel supplied through a fuel electrode and oxidant supplied through an air electrode, to electric energy, comprising:

an air blower sucking in air to supply to the air electrode of the fuel cell;

a manifold disposed between the air blower and the fuel cell and having a passage through which the sucked air is supplied to the air electrode of the fuel cell; and a flow-uniforming device disposed in the passage of the manifold such that flow rate of the sucked air to be supplied to the air electrode of the fuel cell is made uniform, wherein the flow-uniforming device comprises a sponge plate.

6. The apparatus according to claim 5, wherein thickness of the sponge plate is increased in regions in which pressure applied by the sucked air increases.

* * * * *